United States Patent
Daffi

(10) Patent No.: US 6,349,672 B1
(45) Date of Patent: Feb. 26, 2002

(54) FEEDING PAN FOR AUTOMATIC FEED DISPENSERS FOR POULTRY IN GENERAL

(75) Inventor: Giuseppe Daffi, Isorella (IT)

(73) Assignee: Codaf S.r.l., Isorella (IT)

( * ) Notice: Subject to any disclaimer, the term of this patent is extended or adjusted under 35 U.S.C. 154(b) by 0 days.

(21) Appl. No.: 09/679,824

(22) Filed: Oct. 5, 2000

(30) Foreign Application Priority Data

Oct. 26, 1999 (IT) .......................................... MI99A2237

(51) Int. Cl.⁷ ............................................ A01K 39/012
(52) U.S. Cl. ..................................................... 119/52.1
(58) Field of Search ............................. 119/57.1, 57.2, 119/57.3, 57.4, 57.7

(56) References Cited

U.S. PATENT DOCUMENTS 2,640,463 A * 6/1953 Kitson
2,745,380 A * 5/1956 Vanes
5,957,083 A * 9/1999 Cheng ........................ 119/57.4
6,050,220 A * 4/2000 Kimmel et al. ................ 119/53

FOREIGN PATENT DOCUMENTS

| EP | 0 913 085 | 5/1999 |
| EP | 0 931 455 | 7/1999 |
| EP | 0 988 787 | 3/2000 |

\* cited by examiner

*Primary Examiner*—Thomas Price
(74) *Attorney, Agent, or Firm*—Guido Modiano; Albert Josif; Daniel O'Byrne

(57) ABSTRACT

A feeding pan for automatic feed dispensers for poultry in general, which comprises a tray-shaped body connected to a duct for supplying feed which can be coupled to a supply tube. The duct ends with openings for delivery into the tray-shaped body which can be controlled by a rack arranged at preselectable heights, further elements for lifting the rack which can be actuated by the resting of the tray-shaped body on the ground being also provided.

6 Claims, 4 Drawing Sheets

FEEDING PAN FOR AUTOMATIC FEED DISPENSERS FOR POULTRY IN GENERAL

BACKGROUND OF THE INVENTION

The present invention relates to a feeding pan for automatic feed dispensers for poultry in general.

It is known that factory farms for poultry such as chickens, turkeys, guinea fowl and the like currently use automatic feed dispensers which generally have tubes for supplying the feed in a spiral path; pans hang from such tubes and are provided with means for adjusting the level of the feed delivered to the pans.

According to the techniques currently in use, during the first period of growth, when the birds are still chicks, the feeding pans must be placed on the ground and the level of the feed must be kept relatively high in order to allow the chicks to eat.

As the chicks grow, the feeding pan is raised and spaced from the ground; at the same time, the level of the feed is generally lowered in order to avoid waste caused by the fact that the chicken or the like inevitably tends to scatter the feed outwards.

In the current situation, it is necessary to resort to manual intervention in order to position the level adjustment means, with the consequent problems caused by this need.

The need to manually adjust the various levels in fact requires a considerable use of labor, with corresponding costs.

SUMMARY OF THE INVENTION

The aim of the present invention is to eliminate the drawbacks noted above, by providing a feeding pan for automatic feed dispensers for poultry in general which allows to achieve a substantially automatic adjustment of the level of the feed in the pan, with adaptation to the different stages of the growth of the poultry.

Within the scope of this aim, an object of the invention is to provide a feeding pan which can be used with conventional supply tubes without having to resort to particular modifications.

Another object of the present invention is to provide a feeding pan which, by virtue of its particular constructive characteristics, is capable of giving the greatest assurances of reliability and safety in use.

Another object of the present invention is to provide a feeding pan which can be easily obtained starting from commonly commercially available elements and materials and is furthermore competitive from a purely economical point of view.

These and other objects which will become better apparent hereinafter are achieved by a feeding pan for automatic feed dispensers for poultry in general, according to the invention, which comprises a tray-shaped body connected to a supply duct for supplying feed coupled to a supply tube, said supply duct ending with openings for delivery into said tray-shaped body which can be controlled by a rack arranged at preselectable heights, characterized in that it comprises means for lifting said rack which can be actuated by the resting of said tray-shaped body on the ground.

BRIEF DESCRIPTION OF THE DRAWINGS

Further characteristics and advantages of the present invention will become better apparent from the description of a preferred but not exclusive embodiment of a feeding pan for automatic feed dispensers for poultry in general, illustrated only by way of non-limitative example in the accompanying drawings, wherein.

DESCRIPTION OF THE PREFERRED EMBODIMENTS

Figure 1:
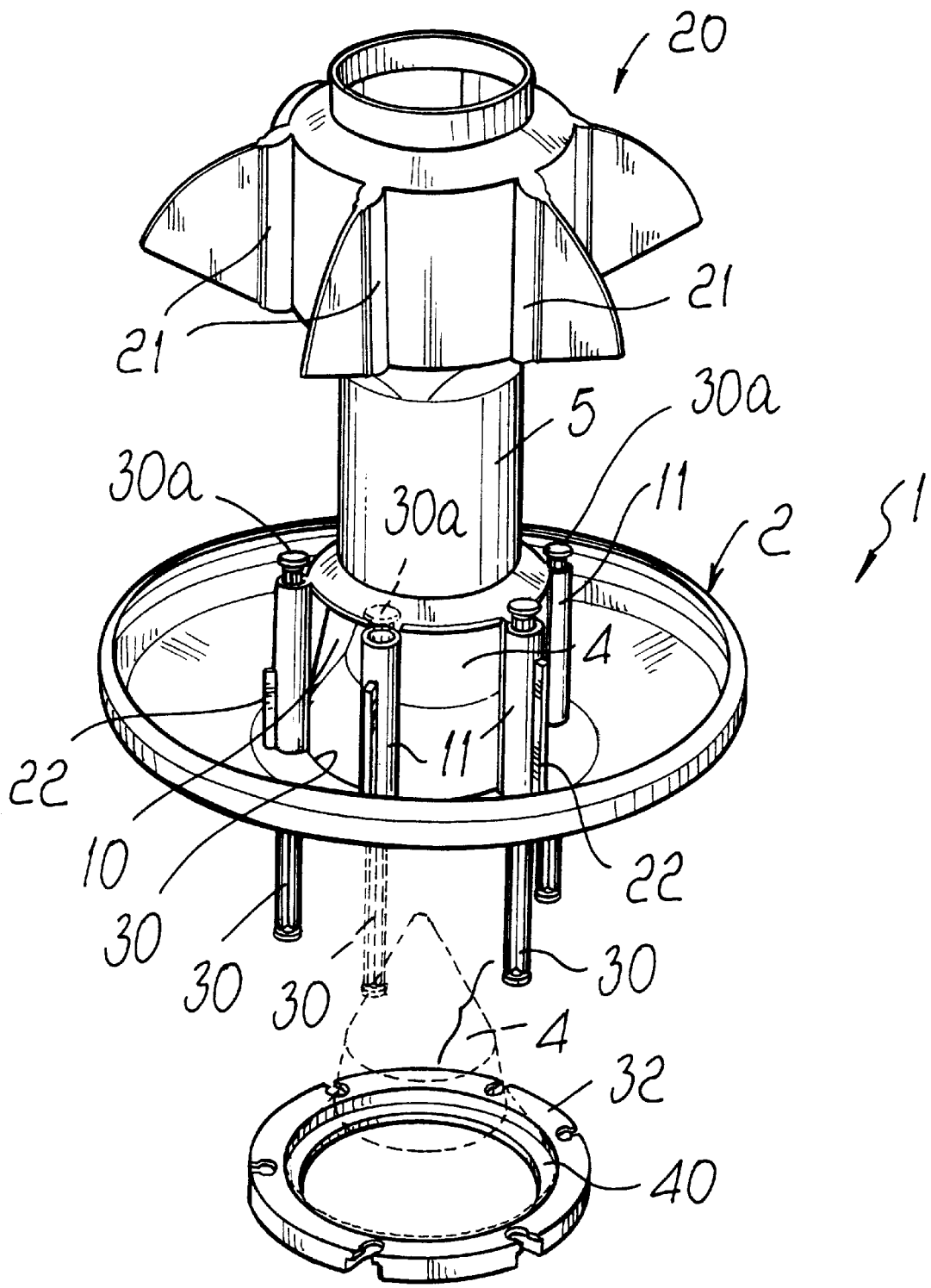
FIG. 1 is an exploded perspective view of a feeding pan according to the invention.
Figure 2:
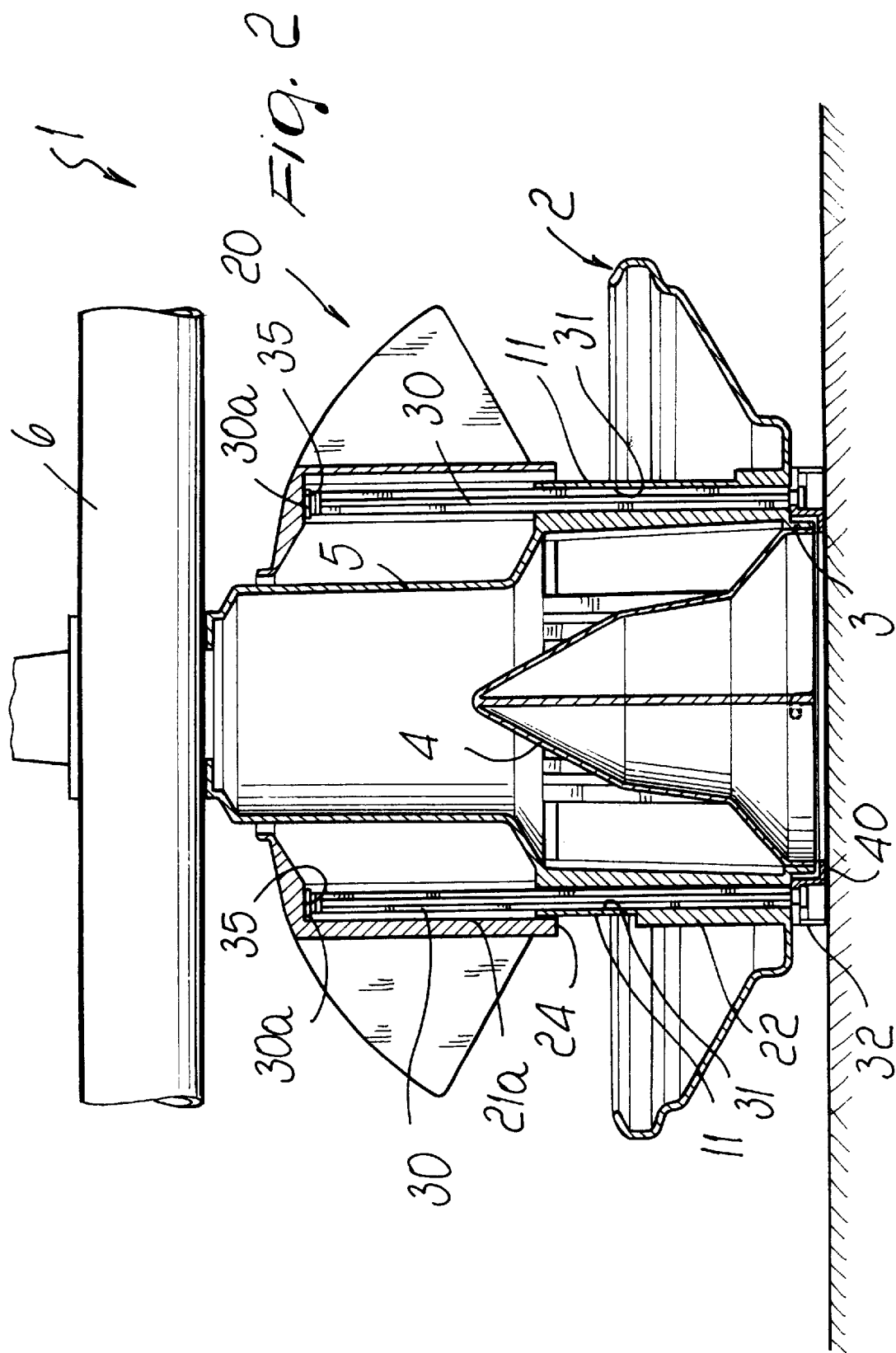
FIG. 2 is a sectional view of the pan, with the tray-shaped body resting on the ground.

With reference to the above figures, the feeding pan for automatic feed dispensers for poultry in general, according to the invention, generally designated by the reference numeral 1, comprises a tray-shaped body 2 which has a preferably circular shape and has, on its bottom, an opening 3 in which it is possible to insert a diffuser cone 4 which can be coupled in a bayonet-like fashion.

A supply duct 5 protrudes in axial alignment with the opening 3, is rigidly coupled to the tray-shaped body 2, and can be connected, in an upward region, in a per se known manner, to a tube 6 for supplying the feed by virtue of spiral-type means or the like.

The duct 5 ends, toward the tray-shaped body, with delivery openings 10 which are circumferentially uniformly distributed and in practice are separated one another by posts 11 described in greater detail hereinafter.

A rack 20 slidingly engages the supply duct 5 and can be arranged at preselectable heights.

In greater detail, the rack 20 forms tubular seats 21 which are provided so as to correspond to the posts 11, on which they engage so as to allow axial sliding.

In order to adjust the level at which the rack is arranged, the posts 11 are provided, in a radial direction, with protruding notches 22 having different heights. One of the seats 21, designated by the reference numeral 21a, is provided with a locator 24 which engages the corresponding notch of the post 11 so that it prevents further downward sliding of the rack 20.

Advantageously, the rack can be arranged in a closed position, in which no feed is delivered, and can be gradually raised to various levels according to the heights of the notches 22.

The zero-level position corresponds to a post which does not have the notch 22.

An important feature of the invention is constituted by the fact that lifting means for the rack 20 are provided which can be actuated by the resting of the tray-shaped body 2 on the ground.

Such lifting means are provided by rods 30 which slidingly engage axial seats 31 formed by the posts 11. The rods 30 are connected, in a downward region, to an annular plate 32 which surrounds the region affected by the opening of the tray-shaped body 2.

The resting of the annular plate 32 on the ground causes the upward sliding of the rods 30 with respect to the posts 11, so that the rods 30 engage, at their larger upper end 30a, the top part 35 of the rack, causing it to rise automatically.

With this arrangement, therefore, when the tray-shaped bodies are rested on the ground, the rack is raised completely, so that a high level of feed, which facilitates the feeding of chicks, can be achieved in the trays 2.

As the chicks grow, the feed supply tubes are raised, and therefore the rack 20 gradually descends.

Figure 3:
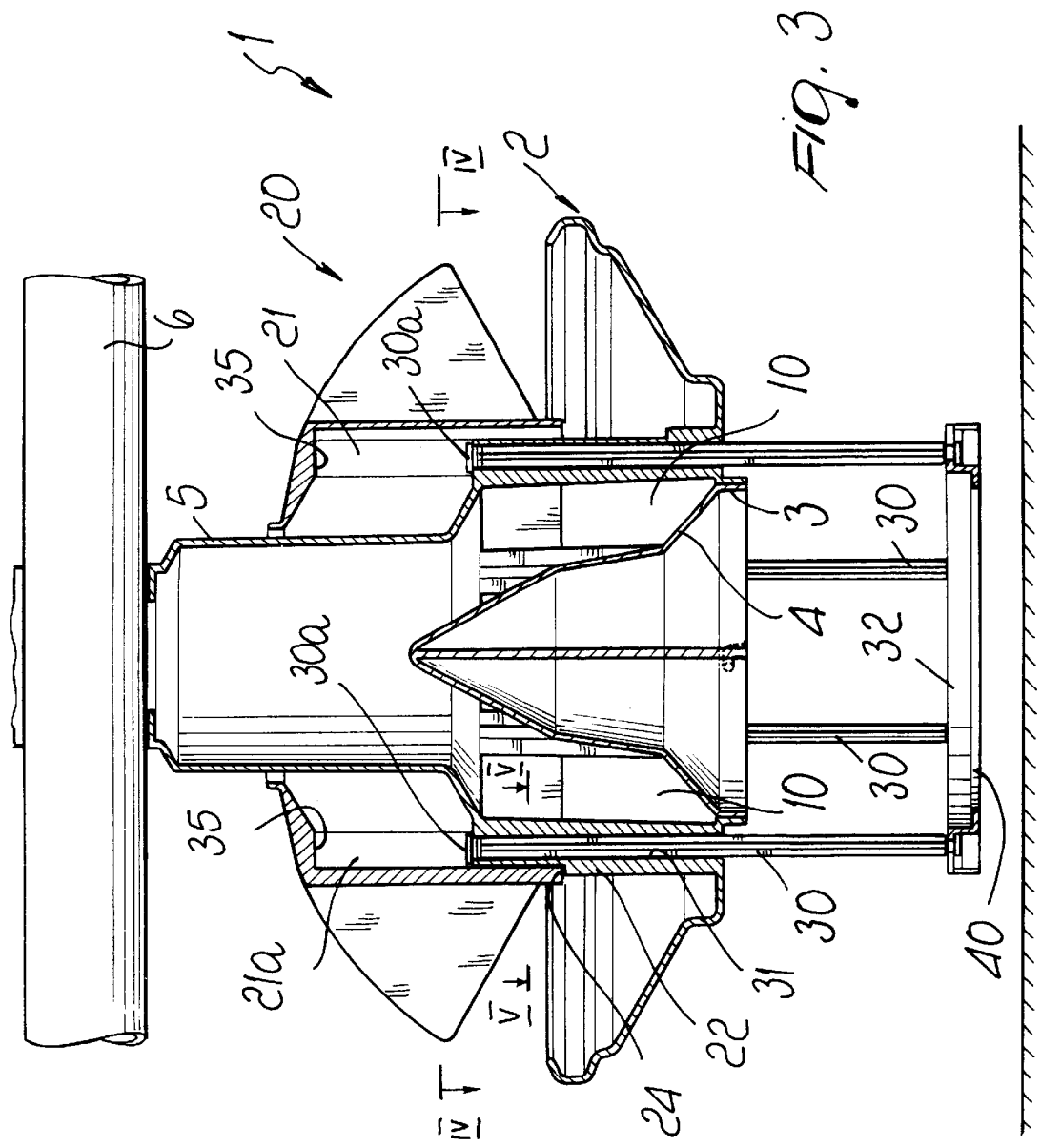
FIG. 3 is a view of the pan, with the tray raised from the ground.
Figure 4:
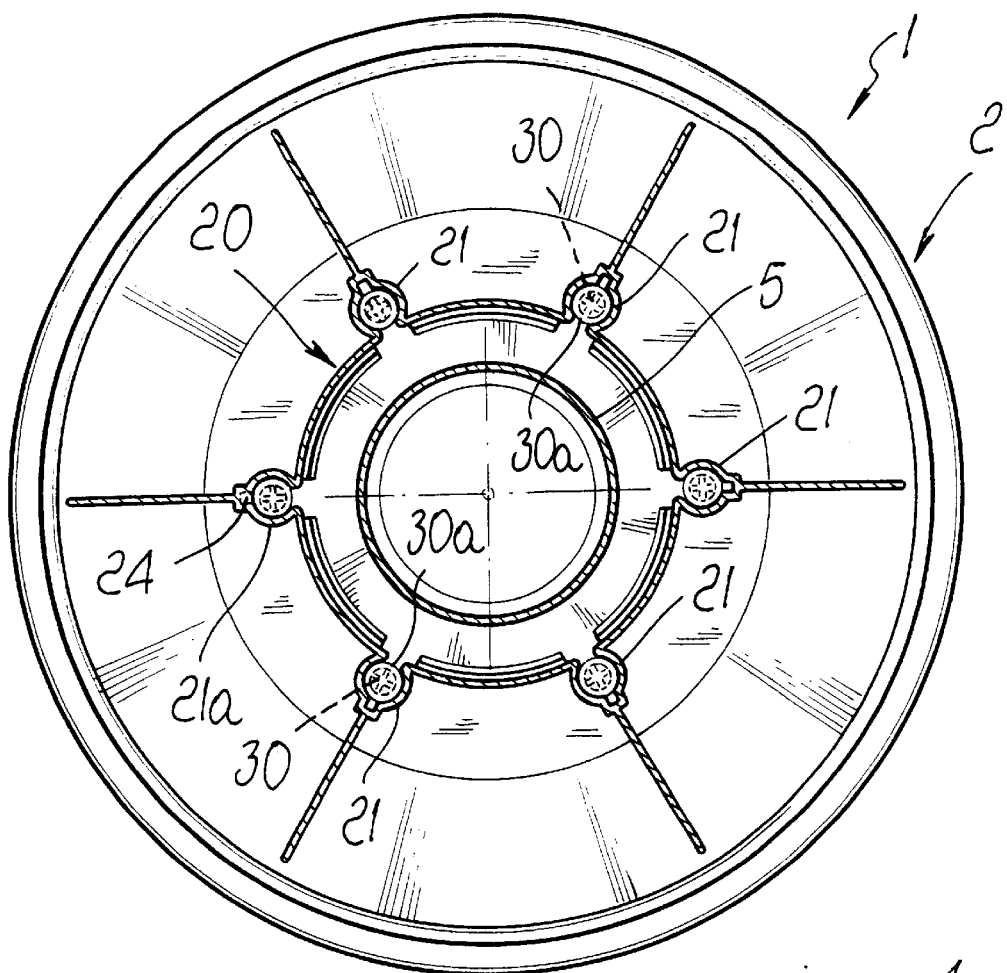
FIG. 4 is a sectional view, taken along the plane IV—IV of FIG. 3.
Figure 5:
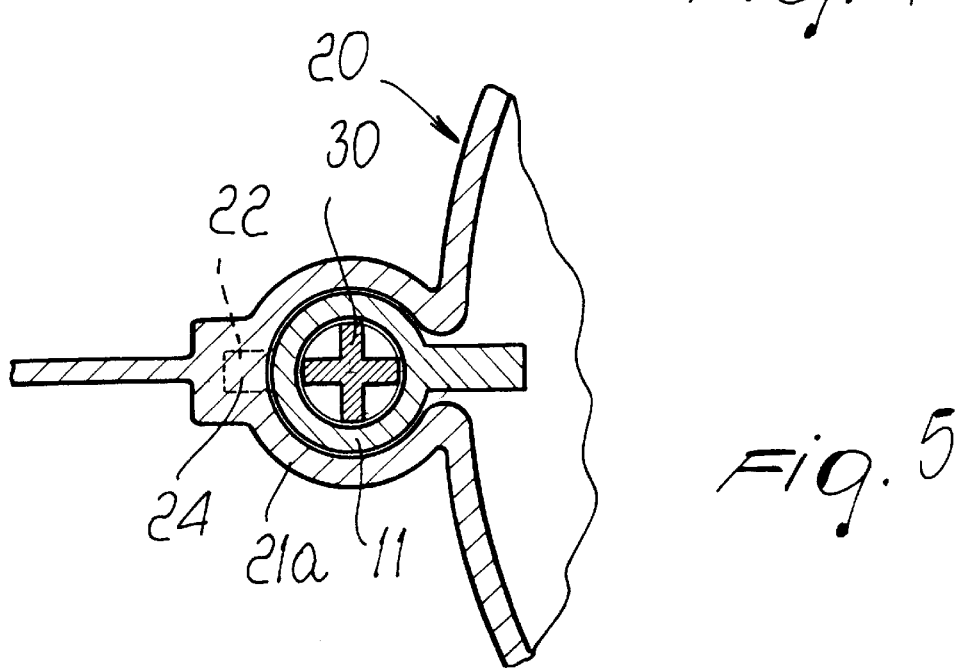
FIG. 5 is a sectional view, taken along the plane V—V of FIG. 3.

The descent of the rack, as shown in FIG. 3, continues until engagement occurs between the locator 24 and the notch of the corresponding post, which determines the preselected level for positioning the rack.

It should be added to the above that the annular plate 32 has an internal rim 40 which acts as supporting element for the closure cone 4 when it is removed from the tray-shaped body for the usual cleaning operations.

During this step, the cone can be easily rested on the rim 40, thus preventing the cone from being able to move freely.

From the above description, it is evident that the invention achieves the intended aim and objects and in particular the fact is stressed that a feeding pan is provided in which the rack, and therefore the feed, rise automatically inside the tray-shaped body, when the tray-shaped body is rested on the ground.

This arrangement therefore eliminates the need to adjust the level of the feed inside the tray-shaped body each time as the poultry grows.

The invention thus conceived is susceptible of numerous modifications and variations, all of which are within the scope of the inventive concept.

All the details may furthermore be replaced with other technically equivalent elements.

In practice, the materials used, as well as the contingent shapes and dimensions, may be any according to requirements.

The disclosures in Italian Patent Application No. MI199A002237 from which this application claims priority are incorporated herein by reference.

What is claimed is:

1. A feeding pan for automatic feed dispensers for poultry in general, comprising a tray-shaped body connected to a supply duct for supplying feed, said duct being coupled to a supply tube, said supply duct ending with openings for delivery into said tray-shaped body which can be controlled by a rack which can be arranged at preselectable heights, further comprising means for lifting said rack which can be actuated by the resting of said tray-shaped body on the ground.

2. The feeding pan according to claim 1, comprising posts for separating said delivery openings, tubular seats formed by said rack slidingly engaging said posts, said posts having, in a radial direction, notches which protrude at different heights and engage a locator formed on said rack for positioning at a preset height.

3. The feeding pan according to claim 2, wherein said means for lifting the rack comprise rods which can be slidingly engaged in axial seats formed by said posts, said rods being axially longer than said axial seats and being adapted to engage the ground in a downward region and said rack in an upward region in order to raise said rack when said rods rest on the ground.

4. The feeding pan according to claim 3, wherein said rods are connected, at a lower end thereof, to an annular plate for connection and resting on the ground.

5. The feeding pan according to claim 4, wherein said annular plate, by virtue of the gradual rise of said tray-shaped body, produces the corresponding lowering of said rack to the preselected level.

6. The feeding pan according to claim 4, wherein said annular plate has an internal rim which is adapted to act as a supporting element for a cone that closes said tray-shaped body when said cone is separated from said tray-shaped body for cleaning operations.

* * * * *